(12) United States Patent
Squillante et al.

(10) Patent No.: US 12,034,331 B2
(45) Date of Patent: Jul. 9, 2024

(54) CHARGING PRIORITY BETWEEN MULTIPLE DEVICES CONNECTED TO A CHARGING CRADLE

(71) Applicant: ZEBRA TECHNOLOGIES CORPORATION, Lincolnshire, IL (US)

(72) Inventors: Gennaro Squillante, Centereach, NY (US); Mariya Wright, Cortland Manor, NY (US); Robert W. DiGiovanna, Shirley, NY (US)

(73) Assignee: Zebra Technologies Corporation, Lincolnshire, IL (US)

( * ) Notice: Subject to any disclaimer, the term of this patent is extended or adjusted under 35 U.S.C. 154(b) by 711 days.

(21) Appl. No.: 17/235,522

(22) Filed: Apr. 20, 2021

(65) Prior Publication Data
US 2022/0337079 A1    Oct. 20, 2022

(51) Int. Cl.
  *H02J 7/00*   (2006.01)
  *G06K 7/10*   (2006.01)
  *H02J 7/34*   (2006.01)

(52) U.S. Cl.
  CPC .......... *H02J 7/345* (2013.01); *G06K 7/10207* (2013.01); *G06K 7/10881* (2013.01)

(58) Field of Classification Search
  USPC ........ 320/102, 104, 106, 107, 108, 109, 110
  See application file for complete search history.

(56) References Cited

U.S. PATENT DOCUMENTS

| | | | |
|---|---|---|---|
| 10,283,975 B1 * | 5/2019 | Venkatasamy | H02J 7/0048 |
| 2020/0412137 A1 * | 12/2020 | Klicpera | H02J 7/0045 |

* cited by examiner

*Primary Examiner* — Brian Ngo

(57) ABSTRACT

An example method for charging a barcode reader that can be implemented by a charging cradle includes: detecting that the barcode reader is coupled to a first interface of the charging cradle for the barcode reader; detecting that a spare battery of the barcode reader is coupled to a second interface of the charging cradle; receiving, via a connection between the charging cradle and a port of a host power source, an indication of a magnitude of an input current that the host power source is capable of delivering to the charging cradle over the connection; comparing the magnitude of the input current to a threshold magnitude; responsive to the comparing, determining a charging order in which to charge the barcode reader and the spare battery using the input current from the host power source; and charging the barcode reader and the spare battery in accordance with the charging order.

27 Claims, 5 Drawing Sheets

CHARGING PRIORITY BETWEEN MULTIPLE DEVICES CONNECTED TO A CHARGING CRADLE

BACKGROUND

A charging cradle may have multiple slots or interfaces for charging multiple, respective devices. To charge the devices, a user connects the charging cradle to a power source via a port, such as a Universal Serial Bus (USB) port. However, the port may be limited to a maximum current. If the multiple devices connected to the charging cradle collectively draw a current that overwhelms the port, the port may shut down. Thus, the charging cradle fails to charge the devices, and a user must intervene to remove devices from the cradle, move the charging cradle to a different port, and/or reset the port.

SUMMARY

In an embodiment, the present invention is a method that can be implemented by a charging cradle for charging a barcode reader. The method comprises: detecting that the barcode reader is coupled to a first interface of the charging cradle for the barcode reader, wherein the charging cradle is to charge the barcode reader over the first interface; detecting that a spare battery of the barcode reader is coupled to a second interface of the charging cradle, wherein the charging cradle is to charge the spare battery over the second interface; receiving, via a connection between the charging cradle and a port of a host power source, an indication of a magnitude of an input current that the host power source is capable of delivering to the charging cradle over the connection; comparing the magnitude of the input current to a threshold magnitude; responsive to the comparing, determining a charging order in which to charge the barcode reader and the spare battery using the input current from the host power source; and charging the barcode reader and the spare battery in accordance with the charging order.

In a variation of this embodiment, the comparing includes determining that the magnitude of the input current is below the threshold magnitude, and determining the charging order includes determining to charge the barcode reader to a predetermined level before charging the battery. Charging the barcode reader and the spare battery may include charging the barcode reader to the predetermined level, and, after charging the barcode reader to the predetermined level, charging the spare battery. Further, the method may include detecting that the barcode reader is decoupled from the charging interface, and, in response to detecting that the barcode reader is decoupled, charging the spare battery.

In another variation of this embodiment, the comparing includes determining that the magnitude of the input current is equal to or above the threshold magnitude, and determining the charging order includes determining to charge the barcode reader and the spare battery simultaneously.

In a further variation of this embodiment, the threshold magnitude may be related to a sum of (i) a first current at which the barcode reader is configured to be charged and (ii) a second current at which the spare battery is configured to be charged.

In yet another variation of embodiment, receiving the indication may include one or more of (i) interrogating, via the connection between the charging cradle and the port of the host power source, the host power source to determine the indication, and receiving the indication responsive to the interrogating, (ii) receiving an identification of a type of the port of the host power source, and determining, based on the identification, the magnitude of the input current, and/or (iii) receiving an identification of a USB type of the port of the host power source, and determining, based on the identification, the magnitude of the input current.

In another embodiment, the present invention is a charging cradle for charging a barcode reader. The charging cradle may comprise: a first interface for charging the barcode reader; a second interface for charging a spare battery of the barcode reader; and a controller configured to: detect that the barcode reader is coupled to the first interface; detect that the spare battery is coupled to the second interface; receive, via a connection between the charging cradle and a port of a host power source, an indication of a magnitude of an input current that the host power source is capable of delivering to the charging cradle over the connection; compare the magnitude of the input current to a threshold magnitude; determine, responsive to comparing the magnitude of the input current to the threshold magnitude, a charging order in which to charge the barcode reader and the spare battery using the input current from the host power source; and charge the barcode reader and the spare battery in accordance with the charging order.

In yet another embodiment, the present invention is a system, comprising: a barcode reader, a spare battery of the barcode reader, and a charging cradle, the charging cradle comprising: a first interface for charging the barcode reader; a second interface for charging the spare battery; and a controller. The controller may be configured to: detect that the barcode reader is coupled to the first interface; detect that the spare battery is coupled to the second interface; receive, via a connection between the charging cradle and a port of a host power source, an indication of a magnitude of an input current that the host power source is capable of delivering to the charging cradle over the connection; compare the magnitude of the input current to a threshold magnitude; determine, responsive to comparing the magnitude of the input current to the threshold magnitude, a charging order in which to charge the barcode reader and the spare battery using the input current from the host power source; and charge the barcode reader and the spare battery in accordance with the charging order.

BRIEF DESCRIPTION OF THE DRAWINGS

The accompanying figures, where like reference numerals refer to identical or functionally similar elements throughout the separate views, together with the detailed description below, are incorporated in and form part of the specification, and serve to further illustrate embodiments of concepts that include the claimed invention, and explain various principles and advantages of those embodiments.

Figure 1:
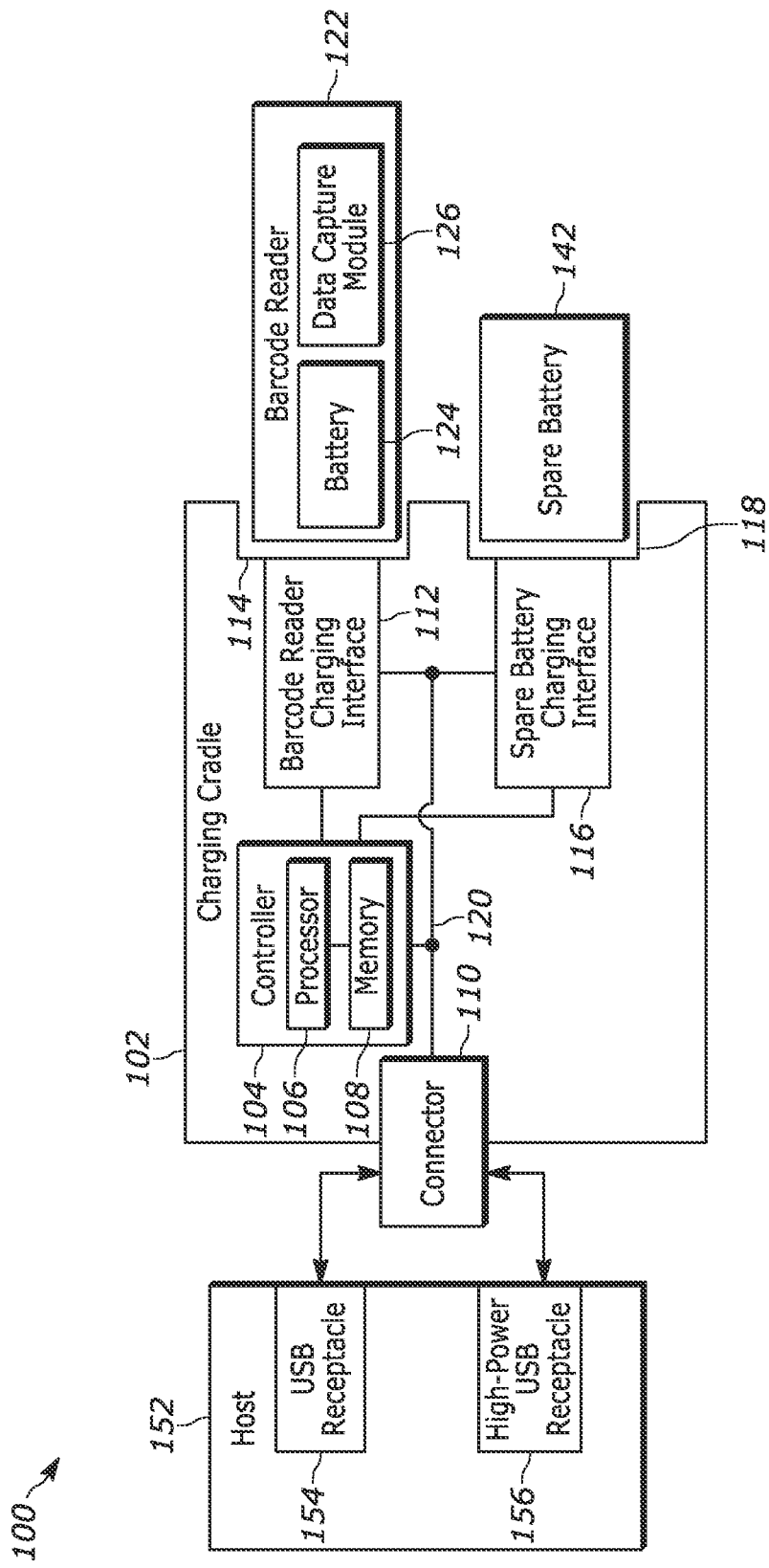
FIG. 1 illustrates a block diagram of an example system including a charging cradle for implementing the example methods and/or operations described herein, including methods for charging a barcode reader.

Skilled artisans will appreciate that elements in the figures are illustrated for simplicity and clarity and have not necessarily been drawn to scale. For example, the dimensions of some of the elements in the figures may be exaggerated relative to other elements to help to improve understanding of embodiments of the present invention.

The apparatus and method components have been represented where appropriate by conventional symbols in the drawings, showing only those specific details that are pertinent to understanding the embodiments of the present invention so as not to obscure the disclosure with details that will be readily apparent to those of ordinary skill in the art having the benefit of the description herein.

DETAILED DESCRIPTION

A charging cradle of this disclosure can implement techniques for determining a charging priority between devices connected to the charging cradle. An example charging cradle may include at least two charging interfaces, including a first interface for charging a barcode reader and a second interface for charging a spare battery of the barcode reader. The charging cradle in turn is also connected to a port of a host power source, which may be a USB port. The port of the host power source may have a maximum current that the host power source is capable of delivering to the charging cradle via the port. However, the combination of the current to charge the barcode reader and the current to charge the spare battery may exceed this maximum current.

Typical charging cradles may attempt to charge both the spare battery and the barcode reader. This can cause the current drawn by the charging cradle to exceed the maximum current of the port, causing the port to shut down and to stop providing current to the charging cradle. A user may be unaware of the port shutdown, and therefore may not realize that the barcode reader and spare battery are not charging. Further, the user may need to disconnect one or both of the barcode reader and spare battery from the charging cradle, reconnect the charging cradle to a different port, and/or reset the port. The user may also be unaware of what caused the charging failure, and may attempt to connect the charging cradle to the port a second time, causing the port to shut down.

Advantageously, a charging cradle configured to implement the techniques of this disclosure automatically detects the maximum current that the port is capable of delivering to the charging cradle, and responds accordingly (i.e., by automatically adjusting the current to one or both of the barcode reader and the barcode scanner). In particular, a charging cradle of this disclosure modulates the current that the charging cradle draws from the port, such that the charging cradle does not attempt to draw more current than the port is configured to provide. To adjust the current that the charging cradle draws from the port, the charging cradle can determine a particular charging order in which to charge devices coupled to the charging cradle. In particular, if the maximum current is below a threshold, the charging cradle charges only the barcode reader. Upon disconnection of the barcode reader from the charging cradle, or when the barcode reader reaches a given charge (e.g., full charge), then the charging cradle can charge the spare battery. If the maximum current exceeds the threshold, the charging cradle can charge both the barcode scanner and the barcode reader. Thus, if the port is capable of providing sufficient current to charge both the barcode scanner and the barcode reader, the charging cradle can detect and take advantage of this capability. Otherwise, the charging cradle can implement a charging order in which one device, such as the barcode reader, is prioritized over other devices coupled to the charging cradle to prevent the charging cradle from overloading the port.

FIG. 1 illustrates a block diagram of an example system 100 including a charging cradle 102 for implementing the example methods and/or operations described herein. The system 100 may include the charging cradle 102, a barcode reader 122, a spare battery 142 for the barcode reader, and a host device 152.

The charging cradle 102 includes a controller 104, which is a logic circuit capable of implementing, for example, the methods disclosed herein, including methods for determining a charging order of devices connected to the charging cradle 102. The example logic circuit of FIG. 1, which can also be referred to as a processing platform, is capable of executing instructions to, for example, implement operations of the example methods described herein, as may be represented by the flowcharts of the drawings that accompany this description. Other example logic circuits capable of, for example, implementing operations of the example methods described herein include field programmable gate arrays (FPGAs) and application specific integrated circuits (ASICs).

The controller 104 includes a processor 106 such as, for example, one or more microprocessors, controllers, and/or any suitable type of processor. The controller 104 also includes memory (e.g., volatile memory, non-volatile memory) 108 accessible by the processor 106 (e.g., via a memory controller). The example processor 106 interacts with the memory 108 to obtain, for example, machine-readable instructions stored in the memory 108 corresponding to, for example, the operations represented by the flowcharts of this disclosure. Additionally or alternatively, machine-readable instructions corresponding to the example operations described herein may be stored on one or more removable media (e.g., a compact disc, a digital versatile disc, removable flash memory, etc.) that may be coupled to controller 104 to provide access to the machine-readable instructions stored thereon. The processor 106, memory 108, and any other elements of the controller 104 may be interconnected via an address/bus.

In some implementations, the controller 104 also includes a network interface (not shown) to enable communication with other machines via, for example, one or more networks. The network interface may include any suitable type of communication interface(s) (e.g., wired and/or wireless interfaces) configured to operate in accordance with any suitable protocol(s). Further, in some implementations, the controller 104 also includes input/output (I/O) interfaces to enable receipt of user input and communication of output data to the user.

In addition to the controller 104, the charging cradle 102 includes a connector 110, a barcode reader charging interface 112, and a spare battery charging interface 116. The elements of the charging cradle 102 may be interconnected by one or more addresses/busses 120. Further, the charging cradle 102 also includes a positioning feature 114 and a positioning feature 118 for the barcode reader 122 and the spare battery 142, respectively. The positioning features 114 and 118 may be, for example, slots that accommodate the barcode reader 122 and the spare battery 142, respectively. The barcode reader 122 and the spare battery 142 may be positioned within the positioning features 114 and 118 so as to keep the barcode reader 122 and the spare battery 142 aligned with the barcode charging interface 112 and the spare battery charging interface 116. Said another way, the positioning feature 114 of the charging cradle 102 receives the barcode reader 122 such that the barcode reader 122 is coupled (e.g., electrically coupled) to the barcode reader charging interface 112, and the positioning feature 118 of the charging cradle 102 receives the spare battery 142 such that the spare battery 142 is coupled (e.g., electrically coupled) to the spare battery charging interface 116. Accordingly, the barcode reader charging interface 112 and the spare battery charging interface 116 are located proximately to the positioning feature 114 and the positioning feature 118, respectively.

The barcode reader charging interface 112 is configured to transfer power from the charging cradle 102 to the barcode reader 122. The barcode reader charging interface 112 may be configured for wireless or wired charging. For example, the barcode reader charging interface 112 may include charging contacts or other physical connectors configured to physically connect to an interface of the barcode reader charging interface 112 to implement wired charging. As another example, the barcode reader charging interface 112 may include an induction coil to implement wireless charging. In such an example, the induction coil of the barcode reader charging interface 112 receives alternating current from the host device 154 and generates an electromagnetic field, such that when the barcode reader 122 is placed in the slot 114, a current is induced in an induction coil of the barcode reader 122.

The spare battery charging interface 116 is configured to transfer power from the charging cradle 102 to the spare battery 142. Similar to the barcode reader charging interface 112, the spare battery charging interface 116 may be configured to charge the spare battery 142 using wired or wireless charging.

The connector 110 is configured to connect the charging cradle 102 to the host device 152. The charging cradle 102 receives current from the host device 152 via the connector 110. The connector 110 may be a Universal Serial Bus (USB) connector, such as a USB plug or male connector that can connect to a USB receptacle or female connector of the host device 152.

The host device 152 is a power source for the charging cradle 102. The charging cradle 102 receives, via the connector 110, power from the host device 152 and transfers power to devices docked in the charging cradle 102 (i.e., coupled to the barcode reader charging interface 112 or the spare battery charging interface 116). The host device 152 may be any electronic device capable of providing power to the charging cradle 102 via the connector 110, such as a personal computer, a portable computer such as a laptop, a charging dock, or a USB wall outlet having one or more USB receptacles.

The host device 152 includes at least one receptacle capable of coupling to the connector 110. In the embodiment depicted in FIG. 1, the host device includes a USB receptacle 154 and a high-power USB receptacle 156. The high-power USB receptacle 156 is capable of providing a higher maximum current than the USB receptacle 154. Depending on the implementation, the host device 152 may include one or both of the USB receptacle 154 and the high-power USB receptacle 156. For example, the USB receptacle 154 may be a standard downstream USB port capable of delivering a maximum current of 500 milliamps (mA) (i.e., 0.5 amps (A)), and the high-power USB port 156 may be a charging downstream USB port or a dedicated charging USB port capable of delivering a maximum current of 1.5 A. The USB receptacles 154 and 156 can each conform to a USB specification (e.g., USB specification 1.0, 1.1, 2.0, 3.0, 3.1, 3.2). While the examples of this disclosure primarily refer to the connector 110 as a USB connector and the receptacles of the host device 152 as USB receptacles, the connector 110 may be any suitable type of connector capable of receiving power from the host device 152, and the host device 152 may have any suitable type of connectors for connecting to the connector 110.

The barcode reader 122 includes a battery 124 and a data capture module 126. The battery 124 can be charged by the charging cradle 102 via the barcode reader charging interface, and may be removably coupled to the barcode reader 122. The battery 124 can be decoupled from the barcode reader 122 and replaced with the spare battery 142. The barcode reader 122 is configured to capture images of symbols, such as a barcodes, and decode the symbols. A data capture module 126 includes software, firmware, and/or hardware for capturing images and decoding symbols depicted in the images. For example, the data capture module 126 may include an imaging engine including one or more cameras or other image sensors configured to capture images of symbols. The data capture module 126 may detect user input (e.g., via a trigger, button, or other user input device of the barcode reader 122) that causes the imaging engine to capture images. Additionally or alternatively, the data capture module 126 may be configured to automatically capture images upon the cameras or image sensors of the data capture module 126 detecting a symbol or barcode. A decode engine of the data capture module 126 may then decode the symbols depicted in the captured images. The data capture module 126 can store the decoded symbols and/or transmit indications of the decoded symbols (e.g., via a wireless connection such as BLUETOOTH, BLE, or NFC) to a computing device.

Figure 2A:
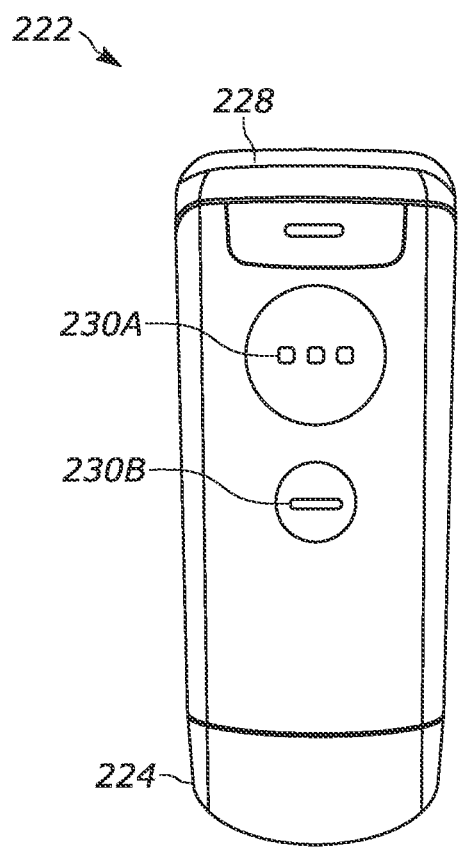
FIG. 2A illustrates an example barcode reader that may be included in the system of FIG. 1.
Figure 2B:
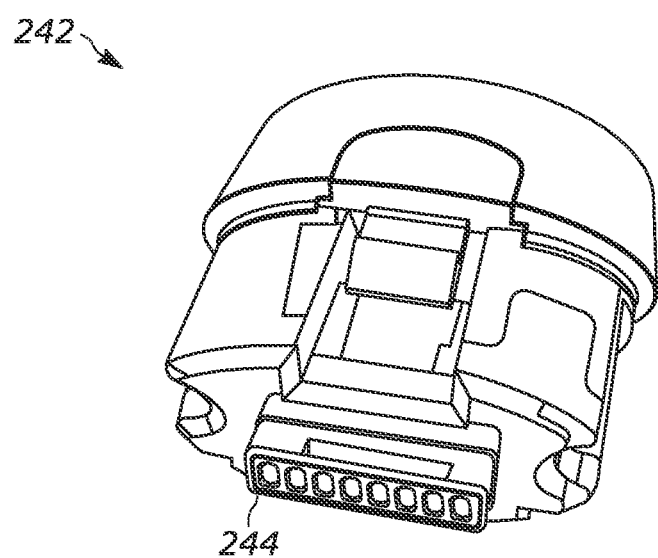
FIG. 2B illustrates an example spare battery for a barcode reader, such as the barcode reader of FIG. 2A.
Figure 2C:
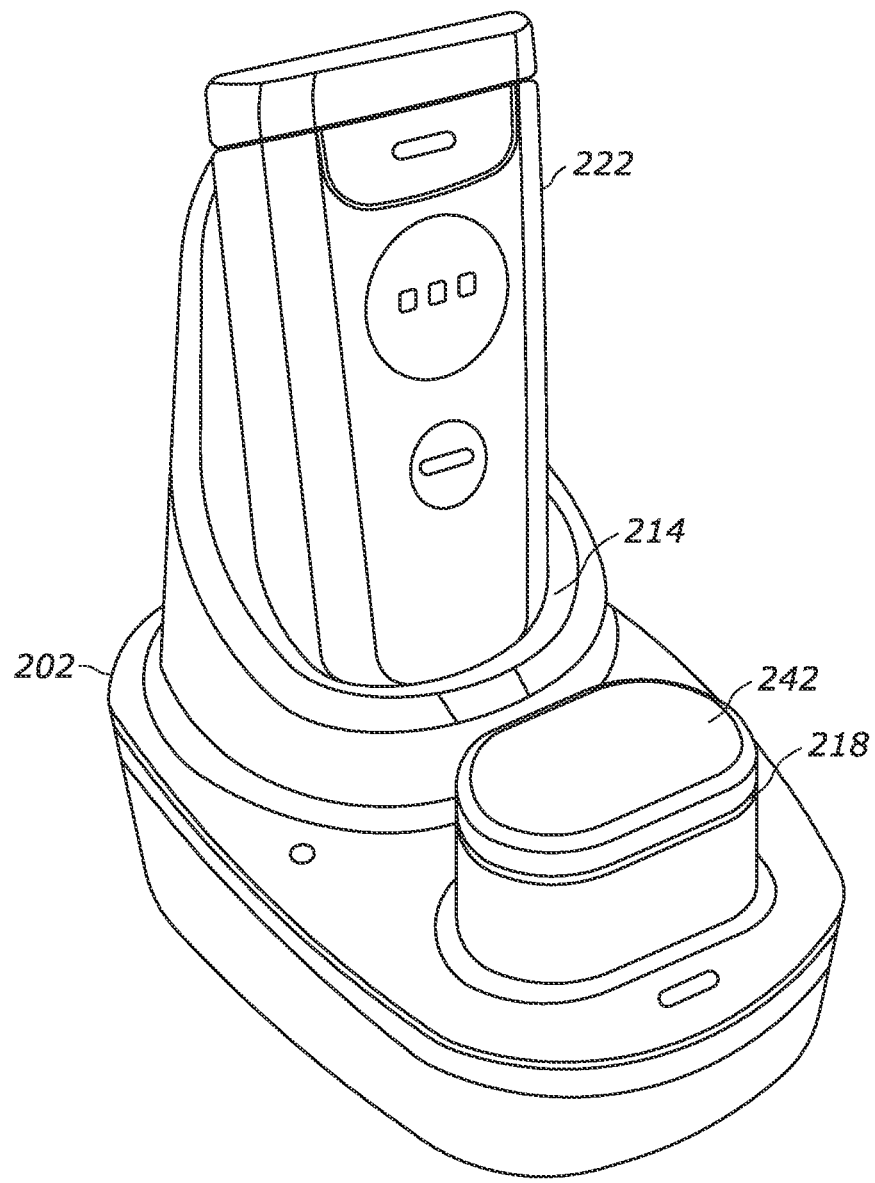
FIG. 2C illustrates an example charging cradle connected to a barcode reader and a spare battery for the barcode reader, which may be included in the system of FIG. 1.

FIGS. 2A-2C depict an example barcode reader, an example spare battery, and an example charging cradle, which may be included in the system of FIG. 1.

FIG. 2A illustrates an example barcode reader 222, which may be the barcode reader 122 depicted in the system 100 of FIG. 1. The barcode reader 222 includes a battery 224, which may be similar to the battery 124, a scanner window 228, and user input buttons 230A and 230B. One or more cameras or other image sensors can capture images of symbols through the scanner window 228. Further, the barcode reader 222 can receive user input via the user input buttons 230A and 230B. For example, one of the user input buttons 230A and 230B may be a trigger that, when pressed, causes an imaging engine of the barcode reader 222 to capture images. In the embodiment depicted in FIG. 2A, the barcode reader 222 can be charged wirelessly (e.g., the barcode reader 222 may include an internal induction coil configured to interface with a barcode reader charging interface (e.g., the barcode reader charging interface 112)).

FIG. 2B illustrates an example spare battery 242, which may be the spare battery 142 depicted in the system 100 of FIG. 1. The spare battery 242 may include a connector 244 configured to couple (e.g., physically and/or electrically) with the barcode reader 222. The battery 224 may be removably coupled to the barcode reader 222, such that the battery 224 can be removed and replaced with the spare battery 242. The connector 244 may also couple to a spare battery charging interface (e.g., the spare battery charging interface 116) when the spare battery 242 is charging.

FIG. 2C illustrates an example charging cradle 202 coupled to the barcode reader 222 and the spare battery 242.

The charging cradle 202 may be the charging cradle 102 depicted in the system 100 of FIG. 1. A positioning feature 214 (e.g., a slot) receives the barcode reader 222, and a positioning feature 218 receives the spare battery 128. Accordingly, FIG. 2C depicts the barcode reader 222 and the spare battery 242 as they appear when docked in the charging cradle 202.

Figure 3:
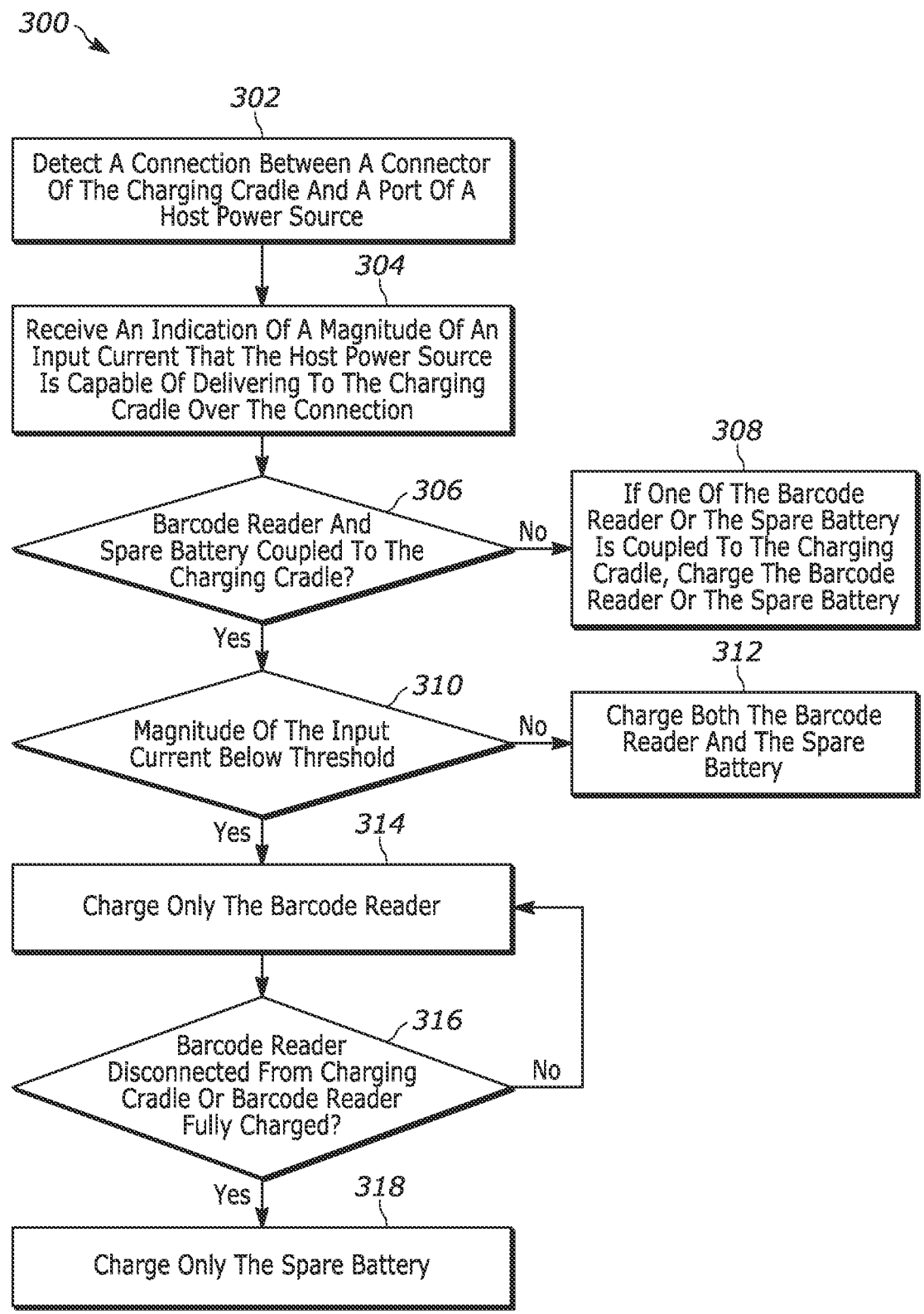
FIG. 3 illustrates a flow diagram of an example method for determining a charging priority between a barcode reader and/or a spare battery, which can be implemented by the charging cradle of FIG. 1.
Figure 4:
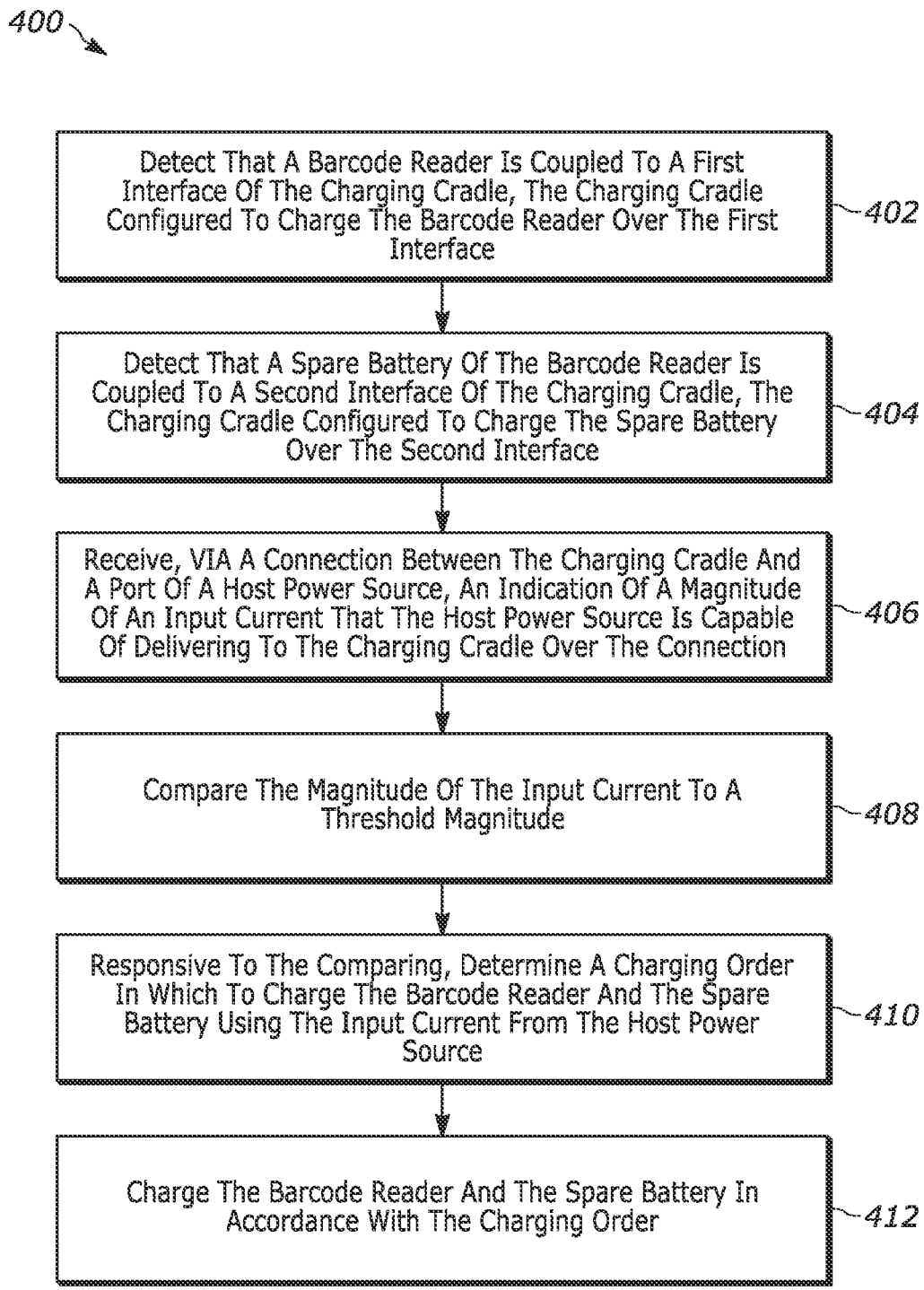
FIG. 4 illustrates a flow diagram of an example method for charging a barcode reader, which can be implemented by the charging cradle of FIG. 1.

FIGS. 3-4 are flow diagrams depicting example methods one or more components of the system 100 of FIG. 1 can implement to determine a charging priority between devices connected to a charging cradle and charge the devices.

FIG. 3 illustrates a flow diagram of an example method 300 for determining a charging priority between a barcode reader and/or a spare battery, which can be implemented by a charging cradle (e.g., the charging cradle 102).

At block 302, the charging cradle detects a connection between a connector (e.g., the connector 110) of the charging cradle and a port (e.g., the USB receptacle 154 or the high-power USB receptacle 156) of a host power source (e.g., the host device 152).

At block 304, the charging cradle receives an indication of a magnitude of an input current that the host power source is capable of delivering to the charging cradle over the connection (i.e., an indication of a maximum current of the port). For example, the charging cradle may interrogate the host power source via the connection and receive the indication in response to the interrogating. The indication of the maximum current may be an indication of a type of port or a type of USB port of the host power source. Based on the type of port, or the type of USB port, the charging cradle can determine the maximum current that the port is capable of delivering. For example, if the charging cradle determines that the port is a standard downstream port, the charging cradle can determine that the maximum current is 500 mA. If the charging cradle determines that the port is a charging downstream port or a dedicated charging port, the charging cradle can determine that the maximum current is 1.5 A. The port types, and the maximum currents associated with the port types, that the charging cradle is capable of identifying can vary by implementation.

As an example, in some implementations, the charging cradle interrogates the host power source in accordance with the Battery Charging Specification 1.2 (BC 1.2) standard. The charging cradle can send a signal (e.g., a pulse) to the port of the host power source via the connector 110. If the charging cradle does not receive a response from the port, then the charging cradle can determine that the port is a standard downstream port. If the charging cradle receives a response from the port, then the charging cradle can send a second signal (e.g., a second pulse) to the port via the connector 110. If the charging cradle does not receive a response to the second signal from the port, then the charging cradle can determine that the port is a charging downstream port. If the charging cradle receives a response to the second signal from the port, then the charging cradle can determine that the port is a dedicated charging port.

At block 306, the charging cradle determines whether both a spare battery (e.g., the spare battery 142) and a barcode reader (e.g., the barcode reader 122) are coupled to the charging cradle. In particular, the charging cradle can determine whether the spare battery is coupled to a spare battery charging interface (e.g., the spare battery charging interface 116) and whether the barcode reader is coupled to a barcode reader charging interface (e.g., the barcode reader charging interface 112). As an example, FIG. 2C illustrates a scenario in which the barcode reader 222 and the spare battery 242 are both coupled to the charging cradle 202.

If only one of the barcode reader or the spare battery is coupled to the charging cradle, then the flow proceeds to block 308. At block 308, the charging cradle charges the device (i.e., either the spare battery or the barcode reader) that is coupled to the charging cradle. The charging cradle can continue to monitor which devices are coupled to the charging cradle. If, at a later time, both the barcode reader and the spare battery are coupled to the charging cradle, then the method can proceed to block 310.

If both the barcode reader and the spare battery are coupled to the charging cradle, then the flow proceeds to block 310. At block 310, the charging cradle determines whether the magnitude of the input current that the host power source is capable of delivering to the charging cradle (i.e., the maximum current) is below a threshold. The threshold can be related to the sum of (i) the current at which the barcode reader is configured to be charged and (ii) the current at which the spare battery is configured to be charged. For example, the threshold can be the sum of a minimum current required to charge the barcode reader and a minimum current required to charge the spare battery. If the barcode reader has a minimum charging current of 400 mA and the spare battery has a minimum charging current of 400 mA, then the threshold may be equal to 800 mA. As another example, the threshold can be related to a sum of a desired current for charging the barcode reader (e.g., a desired current, as set by a controller (e.g., the controller 104) of the charging cradle) and a minimum or desired current for charging the spare battery. The threshold can be set by a controller of the charging cradle such that an input current that is equal to or above the threshold is suitable for charging both the barcode reader and the spare battery. For example, a user or manufacturer of the controller can configure the controller with a threshold representing an input current that can charge the barcode reader at a desired rate and the spare battery at a desired rate. In the example system depicted in FIG. 1, the maximum current may be above the threshold if the connector 110 is connected to the high-power USB receptacle 156, and the maximum current may be below the threshold if the connector 110 is connected to the USB receptacle 154.

If the maximum current is not below the threshold (i.e., the maximum current is equal to or above the threshold), then the flow proceeds to block 312. At block 312, the charging cradle charges both the barcode reader and the spare battery simultaneously. The charging cradle receives the input current from the host power source, and uses this input current to charge both the barcode reader and the spare battery. The charging cradle may charge the barcode reader at the spare battery at different rates, depending on the particular current ratings or other specifications of the devices. Further, the charging cradle may adjust the charging currents to the barcode reader and the spare battery such that the current drawn by the charging cradle from the port does not exceed the maximum current.

If the maximum current is below the threshold, then the flow proceeds to block 314. At block 314, the charging cradle charges only the barcode reader. Thus, even though the spare battery is coupled to the charging cradle, the charging cradle determines not to transfer power to the spare battery. The charging cradle can continue to monitor what devices are coupled to the charging cradle and/or the battery levels of the barcode reader. Thus, at block 316, the charging cradle determines whether the barcode reader has been disconnected from the charging cradle or whether the barcode reader has been fully charged. In other implementations, the charging cradle may determine whether the barcode reader has reached a particular predetermined level (e.g., 50% charged, 75% charged, 95% charged, 100% charged, or other predetermined level configured by a controller of the charging cradle), rather than determining whether the barcode reader is fully charged.

If the barcode reader is still coupled to the charging cradle and has not been fully charged (or has not reached the predetermined level), then the charging cradle continues to charge only the barcode reader. If the barcode reader has been disconnected from the charging cradle or is fully charged (or has reached the predetermined level), then the charging cradle, at block 318, charges only the spare battery. Thus, the charging cradle can switch from charging the barcode reader to charging the spare battery. If, at a later time, the charging cradle detects that the barcode reader is coupled to the charging cradle and that the charge level of the barcode reader is below fully charged (or below the predetermined level), then the charging cradle can return to block 314 and charge only the barcode reader.

Accordingly, if the magnitude of the maximum current is below the threshold, then the charging cradle configures the charging priority between the barcode reader and the spare battery such that the current drawn by the charging cradle remains below the maximum current. If the maximum current is equal to above the threshold, then the charging cradle can use the input current from the host power source to charge both the barcode reader and the spare battery.

FIG. 4 illustrates a flow diagram of an example method 400 for charging a barcode reader (e.g., the barcode reader 122), which can be implemented by a charging cradle (e.g., the charging cradle 102).

At block 402, the charging cradle detects that the barcode reader is coupled to a first interface of the charging cradle (e.g., the barcode reader charging interface 112), where the charging cradle is configured to charge the barcode reader over the first interface. At block 404, the charging cradle detects that a spare battery (e.g., the spare battery 142) is coupled to a second interface of the charging cradle (e.g., the spare battery charging interface 116), where the charging cradle is configured to charge the spare battery over the second interface.

At block 406, the charging cradle receives, via a connection between the charging cradle and a port (e.g., the USB receptacle 154 or the high-power USB receptacle 156) of a host power source (e.g., the host device 152), an indication of a magnitude of an input current that the host power source is capable of delivering to the charging cradle over the connection. For example, the connection may be between a connector (e.g., the connector 110) of the charging cradle and the port of the host power source. To receive the indication, the charging cradle may interrogate the host power source via the connection between the charging cradle and the port and receive the indication in response to the interrogation. The indication may be an identification of a type of port, or, more particularly, an identification of a USB-type of the port. The type of port may be, for example, a standard downstream port, a charging downstream port, a dedicated charging port, and/or a port conforming to a particular USB specification. In some implementations, the indication may be a signal that identifies the type of port. For example, the charging cradle may identify the type of port by interrogating the host power source in accordance with the BC1.2 standard. Based on the type of port, the charging cradle can identify the magnitude of the input current that the port can provide.

At block 408, the charging cradle compares the magnitude of the input current to a threshold magnitude. As discussed in more detail above with reference to block 310, the threshold magnitude can be related to the sum of (i) the current at which the barcode reader is configured to be charged and (ii) the current at which the spare battery is configured to be charged.

At block 410, responsive to the comparing, the charging cradle determines a charging order in which to charge the barcode reader and the spare battery using the input current. At block 412, the charging cradle charges the barcode reader and the spare battery in accordance with the charging order.

If the charging cradle determines at block 408 that the magnitude of the input current is below the threshold magnitude, then the charging cradle can determine at block 410 to charge the barcode reader to a predetermined level before charging the spare battery. For example, the charging cradle can determine to charge the barcode reader until the barcode reader is fully charged (e.g., >99%), or until the charge of the barcode reader reaches another predetermined level (e.g., 50%, 75%, 95%). The predetermined level can be configured by a controller (e.g., the controller 104) of the charging cradle. Further, determining the charging order can also include determining to charge the spare battery after the charging barcode reader to the predetermined level. Thus, after the barcode reader is charged to the predetermined level, the charging cradle can switch to charging the spare battery. If the charging cradle detects that the barcode reader is decoupled from the first interface, the barcode reader can charge the spare battery.

If the charging cradle determines at block 408 that the magnitude of the input current is equal to or above the threshold magnitude, the charging cradle can determine at block 410 to charge the barcode reader and the spare battery simultaneously.

The examples described above (e.g., methods 300 and 400) refer to a charging cradle having two charging interfaces: a first interface for a barcode reader and a second interface for a spare battery of the barcode reader. However, the techniques of this disclosure can also be applied to charging cradles having additional charging interfaces and corresponding positioning features. In particular, as described above, the charging cradle can determine the maximum current that the port of the host power source can provide. Based on the maximum current, the charging cradle can determine a charging order for the devices coupled to the charging cradle. For example, if a barcode reader and two or more spare batteries are coupled to the charging cradle, the charging cradle can prioritize the barcode reader for charging. Thus, if the maximum current is below a threshold, the charging cradle can first charge the barcode reader (or the barcode reader and one of the two or more spare batteries, depending on the available input current from the host power source), and then charge the remaining spare batteries.

The above description refers to a block diagram of the accompanying drawings. Alternative implementations of the example represented by the block diagram includes one or more additional or alternative elements, processes and/or devices. Additionally or alternatively, one or more of the example blocks of the diagram may be combined, divided, re-arranged or omitted. Components represented by the blocks of the diagram are implemented by hardware, software, firmware, and/or any combination of hardware, software and/or firmware. In some examples, at least one of the components represented by the blocks is implemented by a logic circuit. As used herein, the term "logic circuit" is expressly defined as a physical device including at least one hardware component configured (e.g., via operation in accordance with a predetermined configuration and/or via execution of stored machine-readable instructions) to control one or more machines and/or perform operations of one or more machines. Examples of a logic circuit include one or more processors, one or more coprocessors, one or more microprocessors, one or more controllers, one or more digital signal processors (DSPs), one or more application specific integrated circuits (ASICs), one or more field programmable gate arrays (FPGAs), one or more microcontroller units (MCUs), one or more hardware accelerators, one or more special-purpose computer chips, and one or more system-on-a-chip (SoC) devices. Some example logic circuits, such as ASICs or FPGAs, are specifically configured hardware for performing operations (e.g., one or more of the operations described herein and represented by the flowcharts of this disclosure, if such are present). Some example logic circuits are hardware that executes machine-readable instructions to perform operations (e.g., one or more of the operations described herein and represented by the flowcharts of this disclosure, if such are present). Some example logic circuits include a combination of specifically configured hardware and hardware that executes machine-readable instructions. The above description refers to various operations described herein and flowcharts that may be appended hereto to illustrate the flow of those operations. Any such flowcharts are representative of example methods disclosed herein. In some examples, the methods represented by the flowcharts implement the apparatus represented by the block diagrams. Alternative implementations of example methods disclosed herein may include additional or alternative operations. Further, operations of alternative implementations of the methods disclosed herein may combined, divided, re-arranged or omitted. In some examples, the operations described herein are implemented by machine-readable instructions (e.g., software and/or firmware) stored on a medium (e.g., a tangible machine-readable medium) for execution by one or more logic circuits (e.g., processor(s)). In some examples, the operations described herein are implemented by one or more configurations of one or more specifically designed logic circuits (e.g., ASIC(s)). In some examples the operations described herein are implemented by a combination of specifically designed logic circuit(s) and machine-readable instructions stored on a medium (e.g., a tangible machine-readable medium) for execution by logic circuit(s).

As used herein, each of the terms "tangible machine-readable medium," "non-transitory machine-readable medium" and "machine-readable storage device" is expressly defined as a storage medium (e.g., a platter of a hard disk drive, a digital versatile disc, a compact disc, flash memory, read-only memory, random-access memory, etc.) on which machine-readable instructions (e.g., program code in the form of, for example, software and/or firmware) are stored for any suitable duration of time (e.g., permanently, for an extended period of time (e.g., while a program associated with the machine-readable instructions is executing), and/or a short period of time (e.g., while the machine-readable instructions are cached and/or during a buffering process)). Further, as used herein, each of the terms "tangible machine-readable medium," "non-transitory machine-readable medium" and "machine-readable storage device" is expressly defined to exclude propagating signals. That is, as used in any claim of this patent, none of the terms "tangible machine-readable medium," "non-transitory machine-readable medium," and "machine-readable storage device" can be read to be implemented by a propagating signal.

In the foregoing specification, specific embodiments have been described. However, one of ordinary skill in the art appreciates that various modifications and changes can be made without departing from the scope of the invention as set forth in the claims below. Accordingly, the specification and figures are to be regarded in an illustrative rather than a restrictive sense, and all such modifications are intended to be included within the scope of present teachings. Additionally, the described embodiments/examples/implementations should not be interpreted as mutually exclusive, and should instead be understood as potentially combinable if such combinations are permissive in any way. In other words, any feature disclosed in any of the aforementioned embodiments/examples/implementations may be included in any of the other aforementioned embodiments/examples/implementations.

The benefits, advantages, solutions to problems, and any element(s) that may cause any benefit, advantage, or solution to occur or become more pronounced are not to be construed as a critical, required, or essential features or elements of any or all the claims. The claimed invention is defined solely by the appended claims including any amendments made during the pendency of this application and all equivalents of those claims as issued.

Moreover in this document, relational terms such as first and second, top and bottom, and the like may be used solely to distinguish one entity or action from another entity or action without necessarily requiring or implying any actual such relationship or order between such entities or actions. The terms "comprises," "comprising," "has", "having," "includes", "including," "contains", "containing" or any other variation thereof, are intended to cover a non-exclusive inclusion, such that a process, method, article, or apparatus that comprises, has, includes, contains a list of elements does not include only those elements but may include other elements not expressly listed or inherent to such process, method, article, or apparatus. An element proceeded by "comprises . . . a", "has . . . a", "includes . . . a", "contains . . . a" does not, without more constraints, preclude the existence of additional identical elements in the process, method, article, or apparatus that comprises, has, includes, contains the element. The terms "a" and "an" are defined as one or more unless explicitly stated otherwise herein. The terms "substantially", "essentially", "approximately", "about" or any other version thereof, are defined as being close to as understood by one of ordinary skill in the art, and in one non-limiting embodiment the term is defined to be within 10%, in another embodiment within 5%, in another embodiment within 1% and in another embodiment within 0.5%. The term "coupled" as used herein is defined as connected, although not necessarily directly and not necessarily mechanically. A device or structure that is "configured" in a certain way is configured in at least that way, but may also be configured in ways that are not listed.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various embodiments for the purpose of streamlining the disclosure. This method of disclosure is not to be interpreted as reflecting an intention that the claimed embodiments require more features than are expressly recited in each claim. Rather, as the following claims reflect, inventive subject matter may lie in less than all features of a single disclosed embodiment. Thus, the following claims are hereby incorporated into the Detailed Description, with each claim standing on its own as a separately claimed subject matter.

The invention claimed is:

1. A method for charging a barcode reader in a charging cradle, the method comprising:
   detecting that the barcode reader is coupled to a first interface of the charging cradle for the barcode reader, wherein the charging cradle is to charge the barcode reader over the first interface;
   detecting that a spare battery of the barcode reader is coupled to a second interface of the charging cradle, wherein the charging cradle is to charge the spare battery over the second interface;
   receiving, via a connection between the charging cradle and a port of a host power source, an indication of a magnitude of an input current that the host power source is capable of delivering to the charging cradle over the connection;
   comparing the magnitude of the input current to a threshold magnitude;
   responsive to the comparing, determining a charging order in which to charge the barcode reader and the spare battery using the input current from the host power source; and
   charging the barcode reader and the spare battery in accordance with the charging order.

2. The method of claim 1, wherein:
   the comparing includes determining that the magnitude of the input current is below the threshold magnitude; and
   determining the charging order includes determining to charge the barcode reader to a predetermined level before charging the spare battery.

3. The method of claim 2, wherein charging the barcode reader and the spare battery in accordance with the charging order includes:
   charging the barcode reader to the predetermined level; and
   after charging the barcode reader to the predetermined level, charging the spare battery.

4. The method of claim 2, further comprising:
   detecting that the barcode reader is decoupled from the first interface; and
   in response to detecting that the barcode reader is decoupled, charging the spare battery.

5. The method of claim 1, wherein:
   the comparing includes determining that the magnitude of the input current is equal to or above the threshold magnitude; and
   determining the charging order includes determining to charge the barcode reader and the spare battery simultaneously.

6. The method of claim 1, wherein the threshold magnitude is related to a sum of (i) a first current at which the barcode reader is configured to be charged and (ii) a second current at which the spare battery is configured to be charged.

7. The method of claim 1, wherein receiving the indication includes:
   interrogating, via the connection between the charging cradle and the port of the host power source, the host power source to determine the indication; and
   receiving the indication responsive to the interrogating.

8. The method of claim 1, wherein receiving the indication includes:
   receiving an identification of a type of the port of the host power source; and
   determining, based on the identification, the magnitude of the input current.

9. The method of claim 1, wherein receiving the indication includes:
   receiving an identification of a Universal Serial Bus type of the port of the host power source; and
   determining, based on the identification, the magnitude of the input current.

10. A charging cradle for charging a barcode reader, the charging cradle comprising:
    a first interface for charging the barcode reader;
    a second interface for charging a spare battery of the barcode reader; and
    a controller configured to:
      detect that the barcode reader is coupled to the first interface;
      detect that the spare battery is coupled to the second interface;
      receive, via a connection between the charging cradle and a port of a host power source, an indication of a magnitude of an input current that the host power source is capable of delivering to the charging cradle over the connection;
      compare the magnitude of the input current to a threshold magnitude;
      determine, responsive to comparing the magnitude of the input current to the threshold magnitude, a charging order in which to charge the barcode reader and the spare battery using the input current from the host power source; and
      charge the barcode reader and the spare battery in accordance with the charging order.

11. The charging cradle of claim 10, wherein to determine the charging order, the controller is configured to:
    responsive to determining that the magnitude of the input current is below the threshold magnitude, determine to charge the barcode reader to a predetermined level before charging the spare battery.

12. The charging cradle of claim 11, wherein to charge the barcode reader and the spare battery, the controller is configured to:
    charge the barcode reader to the predetermined level; and
    after charging the barcode reader to the predetermined level, charge the spare battery.

13. The charging cradle of claim 11, wherein the controller is further configured to:
    detect that the barcode reader is decoupled from the first interface; and
    in response to detecting that the barcode reader is decoupled, charge the spare battery.

14. The charging cradle of claim 10, wherein to determine the charging order, the controller is configured to:
    responsive to determining that the magnitude of the input current is equal to or above the threshold magnitude, determine to charge the barcode reader and the spare battery simultaneously.

15. The charging cradle of claim 10, wherein the threshold magnitude is related to a sum of (i) a first current at which the barcode reader is configured to be charged and (ii) a second current at which the spare battery is configured to be charged.

16. The charging cradle of claim 10, wherein to receive the indication, the controller is configured to:
    interrogate, via the connection between the charging cradle and the port of the host power source, the host power source to determine the indication; and receive, responsive to interrogating the host power source, the indication.

17. The charging cradle of claim 10, wherein to receive the indication, the controller is configured to:
    receive an identification of a type of the port of the host power source; and
    determine, based on the identification, the magnitude of the input current.

18. The charging cradle of claim 10, wherein to receive the indication, the controller is configured to:
    receive an identification of a Universal Serial Bus type of the port of the host power source; and
    determine, based on the identification, the magnitude of the input current.

19. A system, comprising:
    a barcode reader;
    a spare battery of the barcode reader; and
    a charging cradle, the charging cradle having:
        a first interface for charging the barcode reader;
        a second interface for charging the spare battery; and
        a controller configured to:
            detect that the barcode reader is coupled to the first interface;
            detect that the spare battery is coupled to the second interface;
            receive, via a connection between the charging cradle and a port of a host power source, an indication of a magnitude of an input current that the host power source is capable of delivering to the charging cradle over the connection;
            compare the magnitude of the input current to a threshold magnitude;
            determine, responsive to comparing the magnitude of the input current to the threshold magnitude, a charging order in which to charge the barcode reader and the spare battery using the input current from the host power source; and
            charge the barcode reader and the spare battery in accordance with the charging order.

20. The system of claim 19, wherein to determine the charging order, the controller is configured to:
    responsive to determining that the magnitude of the input current is below the threshold magnitude, determine to charge the barcode reader to a predetermined level before charging the spare battery.

21. The system of claim 20, wherein to charge the barcode reader and the spare battery, the controller is configured to:
    charge the barcode reader to the predetermined level; and
    after charging the barcode reader to the predetermined level, charge the spare battery.

22. The charging cradle of claim 20, wherein the controller is further configured to:
    detect that the barcode reader is decoupled from the first interface; and
    in response to detecting that the barcode reader is decoupled, charge the spare battery.

23. The charging cradle of claim 19, wherein to determine the charging order, the controller is configured to:
    responsive to determining that the magnitude of the input current is equal to or above the threshold magnitude, determine to charge the barcode reader and the spare battery simultaneously.

24. The charging cradle of claim 19, wherein the threshold magnitude is related to a sum of (i) a first current at which the barcode reader is configured to be charged and (ii) a second current at which the spare battery is configured to be charged.

25. The charging cradle of claim 19, wherein to receive the indication, the controller is configured to:
    interrogate, via the connection between the charging cradle and the port of the host power source, the host power source to determine the indication; and
    receive, responsive to interrogating the host power source, the indication.

26. The charging cradle of claim 19, wherein to receive the indication, the controller is configured to:
    receive an identification of a type of the port of the host power source; and
    determine, based on the identification, the magnitude of the input current.

27. The charging cradle of claim 19, wherein to receive the indication, the controller is configured to:
    receive an identification of a Universal Serial Bus type of the port of the host power source; and
    determine, based on the identification, the magnitude of the input current.

* * * * *